United States Patent [19]

Stephenson

[11] Patent Number: 5,534,468
[45] Date of Patent: Jul. 9, 1996

[54] CERAMIC OXIDE COMPOUNDS

[75] Inventor: Ronald R. Stephenson, Kirkland, Wash.

[73] Assignee: The Boeing Company, Seattle, Wash.

[21] Appl. No.: 315,376

[22] Filed: Sep. 30, 1994

Related U.S. Application Data

[62] Division of Ser. No. 566,557, Aug. 13, 1990, Pat. No. 5,407,618.

[51] Int. Cl.$^6$ .......................... C04B 35/50; C04B 35/624
[52] U.S. Cl. ...................... 501/12; 501/152; 252/315.01; 252/521; 429/30; 429/33; 423/263; 423/595; 423/596
[58] Field of Search .................. 501/152, 12; 423/263, 423/595, 596; 429/30, 33; 252/519, 521, 518, 315.01; 505/777, 778, 735, 736, 737

[56] References Cited

U.S. PATENT DOCUMENTS

| | | |
|---|---|---|
| 3,330,697 | 7/1967 | Pechini . |
| 3,702,279 | 11/1972 | Ardary et al. . |
| 3,893,821 | 7/1975 | Davies et al. ............................ 252/521 |
| 3,974,108 | 8/1976 | Staut et al. ............................ 252/521 |
| 3,981,726 | 9/1976 | Douglas et al. ....................... 252/521 |
| 4,045,375 | 8/1977 | Komatu .................................. 501/152 |
| 4,133,778 | 1/1979 | Gray ...................................... 252/521 |
| 4,562,124 | 12/1985 | Ruka ...................................... 429/30 |
| 4,851,150 | 7/1989 | Hench et al. ............................ 501/12 |
| 4,861,753 | 8/1989 | McCarron, III ......................... 505/1 |
| 4,882,304 | 11/1989 | Novich et al. ........................... 501/32 |
| 4,950,562 | 8/1990 | Yoshida et al. ......................... 429/33 |
| 4,981,840 | 1/1991 | Brown et al. ........................... 505/1 |
| 4,999,336 | 3/1991 | Nadkarni et al. ....................... 505/1 |
| 5,061,402 | 10/1991 | Olson et al. ............................ 252/521 |
| 5,061,682 | 10/1991 | Aksay et al. ............................ 505/737 |
| 5,075,282 | 12/1991 | Koinuma et al. ........................ 505/1 |
| 5,080,689 | 1/1992 | Pal et al. ................................. 429/31 |
| 5,091,221 | 2/1992 | Chu et al. ............................... 427/282 |
| 5,114,702 | 5/1992 | Pederson et al. ....................... 505/782 |
| 5,128,284 | 7/1992 | Olson et al. ............................ 252/521 |
| 5,202,306 | 4/1993 | Goretta et al. .......................... 505/1 |

FOREIGN PATENT DOCUMENTS

| | | |
|---|---|---|
| 0248432A2 | 12/1987 | European Pat. Off. . |
| 2315151 | 2/1977 | France .................................. 252/521 |
| 1023691 | 2/1976 | Japan .................................... 252/521 |
| 63-343168 | 4/1987 | Japan . |
| 89-000881 | 6/1987 | Japan . |
| 64-327521 | 3/1988 | Japan . |
| 63-248022 | 10/1988 | Japan . |

OTHER PUBLICATIONS

*Hackh's Chemical Dictionary* McGraw Hill Book Company (1969) p. 641.

Mukherjee, "Sol–Gel Processes in Glass Science and Technology," J. Non–Crystalline Solids 42 (1980) 477–488.

Johnson et al., "Fabrication of Ceramic Articles from High Tc Superconducting Oxides," High Temperature Superconductors, (Apr. 1987) 193–195.

Nies et al., "Glass–Bonded Composites Containing Superconducting YBa2Cu3O[9–y] for Levitation and Magnetic Shielding Applications," Mat. Res. Bull.., vol. 23 (1988) 623–630.

Qiu et al., "Some Properties of Bulk Y–Ba–Cup–O Compounds Containing SiO2," J Appl. Phys., vol. 64, No. 4 (15 Aug. 1988) 2234–2236.

Trolier et al., "Dissolution of YBa2Cu3O[7–x] in Various Solvents", Ceramic Bull., vol. 67, No. 4 (1988) 759–762.

Eror et al., "Polymeric Precursor Synthesis of Ceramic Materials," Proc. Mat. Res. Soc. (1986).

*Primary Examiner*—Paul Marcantoni
*Attorney, Agent, or Firm*—John Hammar

[57] ABSTRACT

A $La_{1-x}Sr_xCr_{1-y}Mn_yO_3$ ceramic oxide gel obtainable by the process comprising the steps of:

(a) providing a colloidal solution of polyhydroxy organic chelating agents selected from the group consisting of ethylene glycol and citric acid and metal salts selected from the group consisting of lanthanum, strontium, chromium, and manganese, each salt being present in an amount necessary to provide the stoichiometric amount of metal ions required in the ceramic oxide gel;

(b) heating the colloidal solution to hydrolyze and polymerize the metal ions in the solution to a mixed metal oxide precursor of the ceramic oxide gel; and (c) adding organic acid, water or both to the precursor of the ceramic oxide gel to peptize the metal ions; and (d) heating the peptized precursor to evaporate solvent to form a thick, viscous, flexible, ductile, handleable gel that can be cast, extruded, or drawn; wherein x and y are independently 0 or 1.

12 Claims, No Drawings

CERAMIC OXIDE COMPOUNDS

This application is a divisional application based on U.S. application 07/566,557, filed Aug. 13, 1990, now U.S. Pat. No. 5,402,618. This application also is related to U.S. application No. 07/325,269 filed Mar. 17, 1989, which is a continuation-in-part of U.S. application No. 07/155,358, filed Feb. 12, 1988, now abandoned.

The present invention is directed ceramic oxide compounds which are formable into fibers, films and other desired shapes which are useful as heating elements, fuel cell connectors, oxygen sensing elements, and other electronic applications.

BACKGROUND OF THE INVENTION

One problem with ceramic materials, typically made by sputtering, is that the ceramic material is brittle, hard and difficult to handle without damaging the ceramic, and is particularly difficult to form into a wire, fiber, or other useful forms such as spheres, bubbles, fine particles, etc.

The present invention provides ceramic materials which can be made into virtually any desired shape or form and which, in particular, may be cast or extruded.

Other objects of the present invention will be apparent from the following description of the preferred embodiments of the invention, the appended claims, and may from the practice of the invention.

SUMMARY OF THE INVENTION

The present invention provides a method for preparing ceramic materials in a predetermined shape and form, comprising the steps of providing a solution of salts of the metals contained in the desired superconducting mixed-metal oxide of predetermined composition, wherein each of the salts is present in an amount necessary to provide the predetermined stoichiometric amount of each respective metal required in the desired ceramic; and wherein the counterions, or hydrolysis products thereof, of the metal ions for each of the salts in the solution are removable from the solution by evaporative methods; subjecting the solution to hydrolyzing conditions and removing the counterions and/or hydrolysis products thereof, and a substantial portion of the solvent, from the solution by evaporative methods; converting the metal ions to a metal oxide precursor of the ceramic; peptizing the mixed metal oxide precursor to form a viscous polymeric sol; forming the viscous polymeric sol into a predetermined shape or form and heat-setting the sol to a flexible, ductile gel; firing the heat-set gel in the presence of oxygen at a temperature and for a period of time sufficient to oxidize and volatilize any remaining vapors and organic materials from the gel and to form the ceramic. Novel ceramic materials according to the present invention are also provided, as well as novel viscous, castable, extrudable metal oxide precursors.

DESCRIPTION OF THE PREFERRED EMBODIMENTS

The present invention provides a method for producing ceramic materials of a predetermined shape, such as tape, fibers, and coatings, films, spheres, bubbles, etc. In the context of the description of the invention the term sol will have its accepted technical meaning: a colloidal solution. The term gel will have its accepted technical meaning: a colloidal solution of a liquid in a solid. The starting materials for the method are soluble salts, in particular the soluble organic salts, of the metals which comprise the final mixed metal oxide superconductor. The metal salts may be soluble in water, or water miscible alcohol, mixtures thereof, or any other water-miscible solvent which can be removed by evaporation without a reaction which is deleterious to the formation of the ceramic. If an appropriate soluble salt of a desired metal is not readily available, but is available as an insoluble metal halide, the metal may be incorporated, alternatively, as a colloidal gel by reacting the metal halide (such as a metal chloride) with water to make a colloidal metal hydroxide. Such a colloidal metal hydroxide may be separated from an ammonium chloride solution, then reacted with the sol containing hydroxides and/or oxides of the other metals to be incorporated into the ceramic.

While not intending to be limited by any particular theory, it is believed that the method of preparation of the ceramics of the present invention permit the formation of the appropriate metal oxide structure to occur on a colloidal level among particles the size of about 1–10 nm in diameter in the proper stoichiometry and lattice conformation, valence ratio and phase relationships, thereby producing compounds which are believed to be more homogeneous than a ceramic of similar composition made by sputtering and sintering of mixed-metal oxide or carbonate powders. Sputtering of metal oxide or carbonate powders allows mixing of particles on the order of 1–10 µm in size, which are sintered more slowly than the colloidal particles according to the method of the present invention.

A solution is first prepared containing soluble salts of the metals ultimately required in the ceramic. These salts are preferably soluble in water or in a water-miscible alcohol, such as methanol, ethanol, isopropanol, ethylene glycol and the like. The appropriate salts include those which provide, as a counterion to the metal ion, an ion which is removable by evaporative methods, or at least the hydrolysis product of which is removable by evaporative methods. The salts include the organic. counterions such as the acetates and formates, as well as counterions which evolve as gases at an appropriate pH, such as the carbonates, nitrates, hydroxides. To assist in solubilizing the metal salts, polyhydroxy chelating compounds, such as, ethylene glycol, and alpha-hydroxy organic acids, such as citric acid, and the like, may be added to form the metal salt solution. The preferred polyhydroxy compounds are citric acid and ethylene glycol. These polyhydroxy compounds and organic acids retain metal salts in solution, since some salts would precipitate under subsequent distillation conditions. Exemplary salts of those metals which comprise the novel ceramics include, but are not limited to:

|  | Soluble in |
|---|---|
| lanthanum carbonate | water (acid pH); EG/CA |
| lanthanum acetate | water |
| strontium formate | water |
| manganese formate | water |
| chromium acetate | water |
|  | EG/CA = ethylene glycol and citric acid |

It is contemplated that in some instances an appropriate soluble salt of a desired metal may not be readily available. In such cases an available insoluble metal halide, such as the metal chloride, may be used to prepare a colloidal metal hydroxide which, in turn, may be later added to the peptized hydroxide sol containing the other metals required for the making of the ceramic. For example, a metal chloride may be reacted with water to form a colloidal metal hydroxide. The colloidal metal hydroxide may be separated from an ammonium chloride solution and then added to the sol containing the other hydroxides or oxides of the other metals. Exemplary halide salts which may be utilized in this manner include, but are not limited to:

strontium fluoride
strontium iodide
strontium bromide
lanthanum chloride

After preparation of the solution of soluble metal salts, if water is not already present in the solution, water is then added and the solution is subjected to hydrolyzing conditions whereby the counterions of the metal ions, or their hydrolysis products, are converted to moieties which are removable, by evaporative methods, such as by evolution of gas, or by evaporation of alcohols or organic acid. This may normally be done by distillation whereby the organic products are removed from the metals along with a substantial portion of the organic solvent and water. Subsequent to or simultaneous with distillation, the metals are converted by heating to oxides to form a mixed metal oxide precursor for ceramic.

The chelates in turn are heated and polymerized to form a mass capable of holding the constituents in suspension. The preferred method is to polymerize the chelating agent, and then individually add the separate constituents to a minimum amount of a fraction of the chelating polymer. A minimum amount of organic agents that will maintain solubility is required to minimize particle size and enhance fiber and film formation by limiting the amount of by products produced on curing.

The metal oxide precursor, which is then typically a homogeneous semi-solid, is peptized to a sol, or fluid colloidal system, usually by addition of an organic acid, such as acetic acid, and/or water. This peptization step is usually conducted by heating at a temperature of less than about 100° C. At this time, metal colloidal gel, prepared by reacting metal halide and water, may be added to provide the metal or metals for which there were no available soluble salts. During this peptization process, the polymeric chains of the inorganic oxides are then formed.

Heating this sol produces a thick, viscous gel which can then be cast into thin strips, extruded, or drawn, as continuous or discontinuous fibers, into thin monofilamentary fibers or multifilamentary tows.

The gel can also be diluted and sprayed as a chemically homogeneous coating, for example, on a resonance cavity of a particle accelerator. Upon forming the gel into its desired form either as continuous fibers, discontinuous fibers, tape, coating, or otherwise, the gel is heat-set, usually by contact with a hot flowing air environment, typically at about 80°–120° C. The resultant hard-gelled oxide is ductile, flexible and handleable, and thus is an improvement over products made by the sintered powder method.

Various sintering aids and glass formers may be added at this time in the ratio of 0.1 to 10 wt. %. Typical glass formers include $P_2O_5$, PbO and $B_2O_3$. Other sintering aids may include reinforcements such as silicon nitride, silicon carbide and similar fibers. These aids improve flexibility, toughness and processability after sintering. The gel is then further advanced to the desired viscosity by heating with or without vacuum. If heated with vacuum, the vacuum and heat should be applied slowly.

As a final step, the mixed metal oxide in its desired hard-gelled shape, is fired at a temperature and for a period of time sufficient to oxidize and volatilize any remaining vapors and organic materials, thereby leaving an intact, dense, mixed metal oxide ceramic its desired form. While this period of time will vary, usually one to six hours will suffice. Usually, the firing temperature will be in the range of about 600° C. to 900° C. The preferred firing temperatures are in the range of 850° C. to 900° C., most preferably at about 875° C. Further sintering at temperatures up to 1450° C. may be desirable, depending on the nature of the sintering aids, if any are used, and the size and shape of the final ceramic product.

The final ceramic materials produced according to the present invention include, but are not limited to, those having the formula $La_{1-x}Sr_xCr_{1-y}Mn_yO_3$ wherein x and y are independently 0 or 1.

Having described the preferred embodiments, the following examples are present by way of illustration, but are not intended to limit the invention in any way.

EXAMPLE

About 0.158 moles of lanthanum acetate, 200 ml of acetic acid and 500 ml of water were combined in a 1 liter flask. The slurry was heated to solution on a rotary evaporator in a water bath held at 60° C. Meanwhile, 30 grams of citric acid and 54 grams of ethylene glycol were mixed in a beaker. This mixture was heated to 155° C. while stirring, and the temperature was maintained for 20 minutes. Then the solution was cooled and 150 ml of water were added. The solution was transferred to the flask on the rotary evaporator and the container was washed with an additional 50 ml of water. Next, the water bath temperature was brought to 60° C. and solvent was removed under vacuum. Meanwhile, 0.175 moles of manganese formate with 200 ml of acetic acid were heated to reflux. Then 300 ml of water were added and heating continued at 90° C. until the salt was dissolved. This solution was cooled to 65° C. and added to the 1 liter vessel. Solvent was removed while repeating the procedure with 0.0175 moles of strontium formate, 10 ml of acetic acid and 25 ml of water. After adding the last solution, solvent was removed by raising the bath temperature to 80° C. Films, fibers, and the like may be processed directly from the transparent amber sol.

Having described the preferred embodiments above of the invention, other modifications and alternative embodiments will be apparent which will be within the spirit and scope of the present invention. The invention is not intended to be limited except by the scope of the following claims.

We claim:

1. A $La_{1-x}Sr_xCr_{1-y}Mn_yO_3$ ceramic oxide gel obtainable by the process comprising the steps of:

(a) providing a colloidal solution of polyhydroxyorganic chelating agents selected from the group consisting of ethylene glycol and citric acid, and metal salts selected from the group consisting of lanthanum, strontium, chromium, and manganese, each salt being present in an amount necessary to provide the stoichiometric amount of metal ions required in the ceramic oxide gel;

(b) heating the colloidal solution to hydrolyze and polymerize the metal ions in the solution to a mixed metal oxide precursor of the ceramic oxide gel; and (c) adding organic acid, water or both to the precursor of the ceramic oxide gel to peptize the metal ions; and (d) heating the peptized precursor to evaporate solvent to form a thick, viscous, flexible, ductile, handleable gel that can be cast, extruded, or drawn; wherein x and y are independently 0 or 1.

2. The ceramic oxide gel of claim 1 further comprising 0.1–10 wt % of a glass former.

3. A ceramic oxide gel of claim 2 wherein the glass former is selected from the group consisting of $P_2O_5$, PbO and $B_2O_3$.

4. The ceramic oxide gel of claim 1 further comprising 0.1–10 wt % of a sintering aid.

5. The ceramic oxide gel of claim 4 wherein the sintering aid is selected from the group consisting of silicon nitride and silicon carbide.

6. The ceramic oxide gel of claim 5 further comprising 0.1–10 wt % of a glass former selected from the group consisting of $P_2O_5$, PbO, and $B_2O_3$.

7. A ceramic oxide precursor colloidal solution for making a $La_{1-x}Sr_xCr_{1-y}Mn_yO_3$ ceramic oxide, wherein x and y are independently 0 or 1, and wherein the mixture solubilizes the metal salts comprising a stoichiometric mixture of soluble metal ions and counterions of lanthanum, strontium, chromium, and manganese metal salts in a mixture having an effective amount of a chelating agent selected from the group consisting of ethylene glycol and citric acid or mixtures thereof to maintain solubility of the metal ions, and an effective amount of a peptizing agent selected from the group consisting of organic acids, water, or mixtures thereof, wherein the counterions of each metal ion or the hydrolysis products of the counterions in the mixture are decomposable and wherein the peptizing agent is present in the minimum amount to maintain solubility of the metal ions by peptizing the metal ions to a colloidal solution and to minimize the particle size so as to enhance fiber and film formation.

8. The ceramic oxide precursor colloidal solution of claim 7 wherein the peptizing agent includes acetic acid.

9. The ceramic oxide precursor colloidal solution of claim 8 wherein the lanthanum salt is lanthanum acetate, wherein the manganese salt is manganese formate, and wherein the strontium salt is strontium formate.

10. The ceramic oxide precursor colloidal solution of claim 8 wherein the chromium salt is chromium acetate.

11. The ceramic oxide precursor colloidal solution of claim 8 further comprising 0.1–10 wt % of a glass former and, optionally, 0.1–10 wt % of a sintering aid selected from the group consisting of silicon nitride and silicon carbide.

12. The precursor colloidal solution of claim 7 wherein the counterions of the metal salts are selected from the group consisting of acetates, formates, carbonates, nitrates, hydroxides, or mixtures thereof.

* * * * *